(12) United States Patent
Zeng et al.

(10) Patent No.: US 10,912,042 B2
(45) Date of Patent: Feb. 2, 2021

(54) METHOD FOR ADJUSTING POWER OF TERMINAL, AND TERMINAL

(71) Applicant: Huawei Technologies Co., Ltd., Shenzhen (CN)

(72) Inventors: Yongbo Zeng, Beijing (CN); Jian Wang, Beijing (CN); Haibo Xu, Beijing (CN); Liping Chen, Xi'an (CN); Hongyue Wang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/477,962

(22) PCT Filed: Jun. 8, 2017

(86) PCT No.: PCT/CN2017/087545
§ 371 (c)(1),
(2) Date: Jul. 15, 2019

(87) PCT Pub. No.: WO2018/129853
PCT Pub. Date: Jul. 19, 2018

(65) Prior Publication Data
US 2019/0373565 A1 Dec. 5, 2019

(30) Foreign Application Priority Data
Jan. 13, 2017 (CN) .......................... 2017 1 0026400

(51) Int. Cl.
*H04B 7/00* (2006.01)
*H04W 52/36* (2009.01)
(Continued)

(52) U.S. Cl.
CPC ..... *H04W 52/365* (2013.01); *H04W 52/0209* (2013.01); *H04W 52/146* (2013.01); *H04W 52/367* (2013.01)

(58) Field of Classification Search
CPC .......... H04W 52/365; H04W 52/0209; H04W 52/146; H04W 52/367
(Continued)

(56) References Cited

U.S. PATENT DOCUMENTS 8,583,137 B2 * 11/2013 Rezaiifar ............ H04W 52/343
455/453
8,811,322 B2 * 8/2014 Feuersanger ......... H04L 5/0007
370/329
(Continued)

FOREIGN PATENT DOCUMENTS

CN 101083496 A 12/2007
CN 101883417 A 11/2010
(Continued)

OTHER PUBLICATIONS

Machine Translation and Abstract of Chinese Publication No. CN105992326, Oct. 5, 2016, 18 pages.
(Continued)

*Primary Examiner* — April G Gonzales
(74) *Attorney, Agent, or Firm* — Conley Rose, P.C.

(57) ABSTRACT

A method for adjusting power of a terminal includes monitoring, by the terminal, usage of an uplink carrier, where the carrier usage includes at least one of a quantity of carriers, duration of continuous use of one or more carriers, and a temperature of the terminal. The method further includes adding, by the terminal, a power back-off value during calculation of power headroom when the terminal detects that the carrier usage satisfies a preset condition, to reduce a value of power headroom of the one or more carriers. The method further includes reporting, by the terminal, the value of the power headroom to a network device.

21 Claims, 6 Drawing Sheets

(51) Int. Cl.
*H04W 52/02* (2009.01)
*H04W 52/14* (2009.01)

(58) Field of Classification Search
USPC .......................................................... 455/522
See application file for complete search history.

(56) References Cited

U.S. PATENT DOCUMENTS

| | | | | |
|---|---|---|---|---|
| 10,448,374 B2* | 10/2019 | Kim | ................... | H04W 52/365 |
| 2012/0329411 A1 | 12/2012 | Chan et al. | | |
| 2014/0080459 A1* | 3/2014 | Taha | ................. | H04W 52/0209 |
| | | | | 455/414.1 |
| 2014/0307681 A1* | 10/2014 | Feuersaenger | ........ | H04L 5/0046 |
| | | | | 370/329 |
| 2015/0271811 A1* | 9/2015 | Kim | ................... | H04W 52/365 |
| | | | | 370/329 |
| 2016/0270007 A1* | 9/2016 | Dinan | ................. | H04W 52/365 |
| 2016/0302205 A1 | 10/2016 | Ji et al. | | |
| 2016/0330697 A1* | 11/2016 | Chen | ................... | H04W 52/365 |

FOREIGN PATENT DOCUMENTS

| | | | | |
|---|---|---|---|---|
| CN | 102687577 A | | 9/2012 | |
| CN | 105992326 A | | 10/2016 | |
| CN | 106162853 A | | 11/2016 | |
| CN | 106165476 A | * | 11/2016 | ............ H04W 52/34 |
| CN | 106165476 A | | 11/2016 | |
| JP | 2014216909 A | | 11/2014 | |
| KR | 20150109970 A | | 10/2015 | |
| WO | 2016078555 A1 | | 5/2016 | |

OTHER PUBLICATIONS

Machine Translation and Abstract of Chinese Publication No. CN1061652853, Nov. 23, 2016, 19 pages.
"3rd Generation Partnership Project; Technical Specification Group Radio Access Network; Evolved Universal Terrestrial Radio Access (E-UTRA); Medium Access Control (MAC) protocol specification (Release 13)," 3GPP TS 36.321, V13.0.0, Dec. 2015, 82 pages.
"3rd Generation Partnership Project; Technical Specification Group Radio Access Network; Evolved Universal Terrestrial Radio Access (E-UTRA); Medium Access Control (MAC) protocol specification (Release 14)," 3GPP TS 36.321, V14.1.0, Dec. 2016, 98 pages.
Foreign Communication From a Counterpart Application, PCT Application No. PCT/CN2017/087545, English Translation of International Search Report dated Oct. 19, 2017, 2 pages.
Foreign Communication From a Counterpart Application, PCT Application No. PCT/CN2017/087545, English Translation of Written Opinion dated Oct. 19, 2017, 5 pages.
Machine Translation and Abstract of Japanese Publication No. JP2014216909, Nov. 17, 2014, 17 pages.
Foreign Communication From a Counterpart Application, European Application No. 17891249.9, Extended European Search Report dated Oct. 28, 2019, 27 pages.
Machine Translation and Abstract of Chinese Publication No. CN101083496, Dec. 5, 2007, 13 pages.
Ericsson, et al., "Adding a Power Management indication in PHR," R2-111601, 3GPP TSG-RAN2 Meeting #73, Taipei, Taiwan, Feb. 21-25, 2011, 5 pages.
Foreign Communication From a Counterpart Application, Chinese Application No. 201780009540.8, Chinese Office Action dated Nov. 27, 2019, 6 pages.

* cited by examiner

| C$_7$ | C$_6$ | C$_5$ | C$_4$ | C$_3$ | C$_2$ | C$_1$ | R |
|---|---|---|---|---|---|---|---|
| P | V | \multicolumn{6}{c|}{PH (Type 2, PCell)} |
| R | R | \multicolumn{6}{c|}{P$_{CMAX,c}$ 1} |
| P | V | \multicolumn{6}{c|}{PH (Type 2, PUCCH SCell)} |
| R | R | \multicolumn{6}{c|}{P$_{CMAX,c}$ 2} |
| P | V | \multicolumn{6}{c|}{PH (Type 1, PCell)} |
| R | R | \multicolumn{6}{c|}{P$_{CMAX,c}$ 3} |
| P | V | \multicolumn{6}{c|}{PH (Type 1, SCell 1)} |
| R | R | \multicolumn{6}{c|}{P$_{CMAX,c}$ 4} |

...

| P | V | PH (Type 1, SCell m) |
|---|---|---|
| R | R | P$_{CMAX,c}$ m |

FIG. 1

METHOD FOR ADJUSTING POWER OF TERMINAL, AND TERMINAL

CROSS-REFERENCE TO RELATED APPLICATIONS

This application is a national stage of International Application No. PCT/CN2017/087545, filed on Jun. 8, 2017, which claims priority to Chinese Patent Application No. 201710026400.3, filed on Jan. 13, 2017. Both of the aforementioned applications are hereby incorporated by reference in their entireties.

TECHNICAL FIELD

Embodiments of the present invention relate to the communications field, and in particular, to a method for adjusting power of a terminal, and a terminal.

BACKGROUND

Carrier aggregation (Carrier Aggregation, CA) is an important feature in long term evolution advanced (Long Term Evolution-Advanced, LTE-A), Uplink and downlink data rates between a terminal and a base station can be improved by using a carrier aggregation technology. The terminal may be user equipment (User Equipment, UE), the base station may be an evolved NodeB (evolved NodeB, eNB), and each UE may communicate with the eNB by using one or more carriers.

After the terminal enables a multi-carrier operation mode, a quantity of downlink (or uplink) carriers exceeds X (for example, X=3), and the terminal continuously works for more than a specific period of time (for example, one hour), a backplane temperature of the terminal increases significantly. Analysis shows that a quantity of carriers increase with a quantity of corresponding radio frequency channels and a quantity of corresponding baseband processing channels. Consequently, the terminal consumes more power, and excessive continuous power consumption increases heat.

To resolve heating caused by a plurality of operating uplink carriers, when a temperature is very high due to excessive power consumption, a direct method is to disable CA transmission, and steps are as follows: When the temperature rises and reaches a specific value, UE is detached from a network. The UE is re-attached to the network and reports a capability parameter without a CA capability or with a relatively low CA capability. When the UE works on a small quantity of component carriers, power consumption is reduced, and then heating is alleviated. When overheating is eliminated, the UE is re-attached to the network with the previous CA capability.

In a detach procedure (Detach Procedure), a terminal is detached from a network, leading to a data transmission interruption, and finally leading to poor user experience.

SUMMARY

Embodiments of the present invention provide a method for adjusting power of a terminal, and a terminal, to resolve heating caused by a plurality of operating uplink carriers, and ensure data transmission continuity, resulting in good user experience.

According to a first aspect, a method for adjusting power of a terminal is provided. The terminal monitors usage of an uplink carrier, where the carrier usage includes at least one of a quantity of carriers, duration of continuous use of one or more carriers, and a temperature of the terminal; the terminal adds a power back-off value during calculation of power headroom when the terminal detects that the carrier usage satisfies a preset condition, to reduce a value of power headroom of the one or more carriers; and the terminal reports the value of the power headroom to a network device.

To adjust power headroom is to adjust power headroom of a carrier. In other words, each carrier has corresponding power headroom. The terminal may adjust power headroom of one or more carriers. The quantity of carriers and duration of continuous use of carriers affect the temperature. Analysis shows that a quantity of carriers increases with a quantity of corresponding radio frequency channels and a quantity of corresponding baseband processing channels. Consequently, power consumption of the terminal increases, and excessive continuous power consumption increases heat. Monitoring these cases can provide a decision-making basis for power headroom adjustment.

In this embodiment of the present invention, the terminal monitors the usage of the uplink carrier, and reduces the reported value of the power headroom by using an event triggering mechanism, so that the network device can adjust uplink resource scheduling for the terminal based on the reported value of the power headroom, thereby reducing the power consumption of the terminal. This embodiment has little impact on the existing standard. In addition, the terminal does not need to be detached from a network. Therefore, existing transmission is not interrupted, data transmission continuity can be ensured, and user experience is good.

In a possible implementation, the terminal monitors the quantity of carriers; and the terminal adds the power back-off value during the calculation of the power headroom when the quantity of carriers reaches a first quantity threshold, to reduce the value of the power headroom of the one or more carriers. According to this implementation, the terminal monitors the quantity of carriers, and the terminal reduces the reported value of the power headroom when the quantity of carriers reaches the first quantity threshold, so that the network device can adjust uplink resource scheduling for the terminal based on the reported value of the power headroom, thereby reducing the power consumption of the terminal.

In a possible implementation, the terminal monitors the duration of continuous use of one or more carriers; and the terminal adds the power back-off value during the calculation of the power headroom when duration of continuous use of each of the one or more carriers reaches a first time threshold or duration of continuous use of each of more than a predetermined quantity of carriers in the one or more carriers reaches the first time threshold, to reduce the value of the power headroom of the one or more carriers. According to this implementation, the terminal monitors the duration of continuous use of one or more carriers, and the terminal reduces the reported value of the power headroom when the duration of continuous use of each of the one or more carriers reaches the first time threshold or the duration of continuous use of each of the more than a predetermined quantity of carriers in the one or more carriers reaches the first time threshold, so that the network device can adjust uplink resource scheduling for the terminal based on the reported value of the power headroom, thereby reducing the power consumption of the terminal.

In a possible implementation, the terminal monitors the temperature of the terminal; and the terminal adds the power back-off value during the calculation of the power headroom when the temperature of the terminal reaches a first temperature threshold, to reduce the value of the power headroom of the one or more carriers. According to this implementation, the terminal monitors the temperature of the terminal, and the terminal reduces the reported value of the power headroom when the temperature of the terminal reaches the first temperature threshold, so that the network device can adjust uplink resource scheduling for the terminal based on the reported value of the power headroom, thereby reducing the power consumption of the terminal.

In a possible implementation, after the adding, by the terminal, the power back-off value during the calculation of the power headroom when the temperature of the terminal reaches a first temperature threshold, to reduce the value of the power headroom of the one or more carriers, the method further includes: starting, by the terminal, a timer; and stopping adding, by the terminal, the power back-off value during the calculation of the power headroom when the timer ends, to stop reducing the value of the power headroom of the one or more carriers. According to this implementation, after a period of time, the terminal can be re-attached to the network with a previous CA capability.

In a possible implementation, after the adding, by the terminal, the power back-off value during the calculation of the power headroom when the temperature of the terminal reaches a first temperature threshold, to reduce the value of the power headroom of the one or more carriers, the method further includes: stopping adding, by the terminal, the power back-off value during the calculation of the power headroom when the temperature of the terminal drops to a second temperature threshold, to stop reducing the value of the power headroom of the one or more carriers, where the first temperature threshold is greater than the second temperature threshold. According to this implementation, after the temperature of the terminal drops to a particular temperature, the terminal can be re-attached to the network with a previous CA capability.

In a possible implementation, the terminal monitors the quantity of carriers and the duration of continuous use of one or more carriers; and the terminal adds the power back-off value during the calculation of the power headroom when the quantity of carriers reaches a second quantity threshold, and/or when duration of continuous use of each of the one or more carriers reaches a second time threshold or duration of continuous use of each of more than a predetermined quantity of carriers in the one or more carriers reaches the second time threshold, to reduce the value of the power headroom of the one or more carriers. According to this implementation, the terminal simultaneously monitors two parameters: the quantity of carriers and the duration of continuous use of one or more carriers, and reduces the reported value of the power headroom when values of the two parameters satisfy the preset condition or one of the parameters satisfies the preset condition, so that the network device can adjust uplink resource scheduling for the terminal based on the reported value of the power headroom, thereby reducing the power consumption of the terminal.

In a possible implementation, the terminal monitors the quantity of carriers, the duration of continuous use of one or more carriers, and the temperature of the terminal; and the terminal adds the power back-off value during the calculation of the power headroom when the quantity of carriers reaches a third quantity threshold, and/or when duration of continuous use of each of the one or more carriers reaches a third time threshold or duration of continuous use of each of more than a predetermined quantity of carriers in the one or more carriers reaches the third time threshold, and/or when the temperature of the terminal reaches a third temperature threshold, to reduce the value of the power headroom of the one or more carriers. According to this implementation, the terminal simultaneously monitors three parameters: the quantity of carriers, the duration of continuous use of one or more carriers, and the temperature of the terminal, and reduces the reported value of the power headroom when values of all the three parameters satisfy the preset condition or one of the parameters satisfies the preset condition or two of the parameters satisfy the preset condition, so that the network device can adjust uplink resource scheduling for the terminal based on the reported value of the power headroom, thereby reducing the power consumption of the terminal.

In a possible implementation, the terminal selects the one or more carriers from the carriers in any one of the following manners: The terminal selects a first carrier set from the carriers in a first time period, and selects a second carrier set from the carriers in a second time period, where the first carrier set and the second carrier set include different carders; or the terminal randomly selects the one or more carriers from the carriers; or the terminal selects the one or more carriers with a worst channel quality indicator (Channel Quality Indicator CQI) or a best CQI from the carriers; or the terminal selects the one or more carriers with smallest power headroom from the carriers; or the terminal selects the one or more carriers with highest maximum transmit power from the carriers.

According to a second aspect, a method for adjusting power of a terminal is provided. The terminal adds, in a first time period, a power hack-off value during calculation of power headroom, to reduce a value of power headroom of one or more carriers; the terminal stops adding, in a second time period, the power back-off value during the calculation of the power headroom, to stop reducing the value of the power headroom of the one or more carriers; and the terminal reports the value of the power headroom to a network device.

In this embodiment of the present invention, the reported value of the power headroom is reduced through periodic triggering, so that the network device can adjust uplink resource scheduling for the terminal based on the reported value of the power headroom, thereby reducing the power consumption of the terminal, and reducing transmit power before a temperature rises to a particular threshold.

In a possible implementation, the terminal selects the one or more carriers from the carriers in any one of the following manners: The terminal selects a first carrier set from the carriers in a third time period, and selects a second carrier set from the carriers in a fourth time period, where the first carrier set and the second carrier set include different carriers; or the terminal randomly selects the one or more carriers from the carriers; or the terminal selects the one or more carriers with a worst CQI or a best CQI from the carriers; or the terminal selects the one or more carriers with smallest power headroom from the carriers; or the terminal selects the one or more carriers with highest maximum transmit power from the carriers.

According to a third aspect, a method for adjusting power of a terminal is provided. The terminal monitors usage of an uplink carrier, where the carrier usage includes at least one of a quantity of carriers, duration of continuous use of one or more carriers, and a temperature of the terminal; the terminal sets at least one information bit of an extended power headroom report (Extended Power Headroom Report, ePHR) when the terminal detects that the carrier usage satisfies a preset condition, where the at least one information bit is used to request a network device to instruct the terminal to reduce transmit power on one or more carriers; and the terminal reports the ePHR to the network device.

In this embodiment of the present invention, the terminal monitors the usage of the uplink carrier, and sends an uplink power adjustment request to the network device by using the information bit in the ePHR and an event triggering mechanism, so that the network device can adjust uplink resource scheduling for the terminal and/or adjust a transmit power control command (Transmission Power Command, TPC) parameter on a corresponding carrier according to the uplink power adjustment request, thereby reducing power consumption of the terminal. This embodiment has little impact on the existing standard. In addition, the terminal does not need to be detached from a network. Therefore, existing transmission is not interrupted, data transmission continuity can be ensured, and user experience is good.

In a possible implementation, the terminal monitors the quantity of carriers, and the terminal sets the at least one information bit of the ePHR when the quantity of carriers reaches a first quantity threshold, where the at least one information bit is used to request the network device to instruct the terminal to reduce the transmit power on the one or more carriers. According to this implementation, the terminal monitors the quantity of carriers, and the terminal sets the at least one information bit of the ePHR when the quantity of carriers reaches the first quantity threshold, so that the network device can adjust uplink resource scheduling for the terminal and/or adjust the TPC parameter on the corresponding carrier based on the at least one information bit of the ePHR, thereby reducing power consumption of the terminal.

In a possible implementation, the terminal monitors the duration of continuous use of one or more carriers, and the terminal sets the at least one information bit of the ePHR when duration of continuous use of each of the one or more carriers reaches a first time threshold or duration of continuous use of each of more than a predetermined quantity of carriers in the one or more carriers reaches the first time threshold, where the at least one information bit is used to request the network device to instruct the terminal to reduce the transmit power on the one or more carriers. According to this implementation, the terminal monitors the duration of continuous use of one or more carriers, and the terminal sets the at least one information bit of the ePHR when the duration of continuous use of each of the one or more carriers reaches the first time threshold or the duration of continuous use of each of the more than a predetermined quantity of carriers in the one or more carriers reaches the first time threshold, so that the network device can adjust uplink resource scheduling for the terminal and/or adjust the TPC parameter on the corresponding carrier based on the at least one information bit of the ePHR, thereby reducing power consumption of the terminal.

In a possible implementation, the terminal monitors the temperature of the terminal, and the terminal sets the at least one information bit of the ePHR when the temperature of the terminal reaches a first temperature threshold, where the at least one information bit is used to request the network device to instruct the terminal to reduce the transmit power on the one or more carriers. According to this implementation, the terminal monitors the temperature of the terminal, and the terminal sets the at least one information bit of the ePHR when the temperature of the terminal reaches the first temperature threshold, so that the network device can adjust uplink resource scheduling for the terminal and/or adjust the TPC parameter on the corresponding carrier based on the at least one information bit of the ePHR, thereby reducing power consumption of the terminal.

In a possible implementation, after the terminal sets the at least one information bit of the ePHR when the temperature of the terminal reaches the first temperature threshold, where the at least one information bit is used to request the network device to instruct the terminal to reduce the transmit power on the one or more carriers, the terminal starts a timer; and the terminal stops setting the at least one information bit of the ePHR when the timer ends, where the at least one information bit is used to request the network device to instruct the terminal to stop reducing the transmit power on the one or more carriers. According to this implementation, after a period of time, the terminal can be re-attached to the network with a previous CA capability.

In a possible implementation, after the terminal sets the at least one information bit of the ePHR when the temperature of the terminal reaches the first temperature threshold, where the at least one information bit is used to request the network device to instruct the terminal to reduce the transmit power on the one or more carriers, the terminal stops setting the at least one information bit of the ePHR when the temperature of the terminal drops to a second temperature threshold, where the at least one information bit is used to request the network device to instruct the terminal to stop reducing the transmit power on the one or more carriers, and the first temperature threshold is greater than the second temperature threshold. According to this implementation, after the temperature of the terminal drops to a particular temperature, the terminal can be re-attached to the network with a previous CA capability.

In a possible implementation, the terminal monitors the quantity of carriers and the duration of continuous use of one or more carriers, and the terminal sets the at least one information bit of the ePHR when the quantity of carriers reaches a second quantity threshold, and/or when duration of continuous use of each of the one or more carriers reaches a second time threshold or duration of continuous use of each of more than a predetermined quantity of carriers in the one or more carriers reaches the second time threshold, where the at least one information bit is used to request the network device to instruct the terminal to reduce the transmit power on the one or more carriers. According to this implementation, the terminal simultaneously monitors two parameters: the quantity of carriers and the duration of continuous use of one or more carriers, and sets the at least one information bit of the ePHR when values of the two parameters satisfy the preset condition or one of the parameters satisfies the preset condition, so that the network device can adjust uplink resource scheduling for the terminal and/or adjust the TPC parameter on the corresponding carrier based on the at least one information bit of the ePHR, thereby reducing power consumption of the terminal.

In a possible implementation, the terminal monitors the quantity of carriers, the duration of continuous use of one or more carriers, and the temperature of the terminal, and the terminal sets the at least one information bit of the ePHR when the quantity of carriers reaches a third quantity threshold, and/or when duration of continuous use of each of the one or more carriers reaches a third time threshold or duration of continuous use of each of more than a predetermined quantity of carriers in the one or more carriers reaches the third time threshold, and/or when the temperature of the terminal reaches a third temperature threshold, where the at least one information bit is used to request the network device to instruct the terminal to reduce the transmit power on the one or more carriers. According to this implementation, the terminal simultaneously monitors three parameters: the quantity of carriers, the duration of continuous use of one or more carriers, and the temperature of the terminal, and sets the at least one information bit of the ePHR when values of all the three parameters satisfy the preset condition or one of the parameters satisfies the preset condition or two of the parameters satisfy the preset condition, so that the network device can adjust uplink resource scheduling for the terminal and/or adjust the TPC parameter on the corresponding carrier based on the at least one information bit of the ePHR, thereby reducing power consumption of the terminal.

In a possible implementation, the terminal sets the at least one information bit in the ePHR, where the at least one information bit is used to request the network device to instruct the terminal to adjust the transmit power on the one or more carriers corresponding to the at least one information bit to 0, and the terminal sets a power headroom (Power Headroom, PH) value corresponding to the at least one information bit in the ePHR to an invalid value; and/or the terminal sets the at least one information bit in the ePHR, where the at least one information bit is used to request the network device to instruct the terminal to reduce the transmit power on the one or more carriers corresponding to the at least one information bit by a first transmit power value, and the terminal sets a PH value corresponding to the at least one information bit in the ePHR, where the PH value is used to indicate the first transmit power value; and/or the terminal sets the at least one information bit in the ePHR, where the at least one information bit is used to request the network device to instruct the terminal to reduce the transmit power on the one or more carriers corresponding to the at least one information bit by a preset power back-off value. According to this implementation, in addition to the at least one information bit of the ePHR, the terminal also sets the PH value, so that the network device can adjust uplink resource scheduling for the terminal and/or the TPC parameter on the corresponding carrier based on the at least one information bit of the ePHR and the PH value, thereby reducing power consumption of the terminal.

In a possible implementation, the terminal selects the one or more carriers from the carriers in any one of the following manners: The terminal selects a first carrier set from the carriers in a first time period, and selects a second carrier set from the carriers in a second time period, where the first carrier set and the second carrier set include different carriers; or the terminal randomly selects the one or more carriers from the carriers; or the terminal selects the one or more carriers with a worst CQI or a best CQI from the carriers; or the terminal selects the one or more carriers with smallest power headroom from the carriers; or the terminal selects the one or more carriers with highest maximum transmit power from the carriers.

According to a fourth aspect, a method for adjusting power of a terminal is provided. The terminal sets at least one information bit of an ePHR in a first time period, where the at least one information bit is used to request a network device to instruct the terminal to reduce transmit power on one or more carriers; the terminal stops setting the at least one information bit of the ePHR in a second time period, where the at least one information bit is used to request the network device to instruct the terminal to stop reducing the transmit power on the one or more carriers; and the terminal reports the ePHR to the network device.

In this embodiment of the present invention, an uplink power adjustment request is sent to the network device by using the information bit in the ePHR and through periodic triggering, so that the network device can adjust uplink resource scheduling for the terminal and/or adjust a TPC parameter on a corresponding carrier according to the uplink power adjustment request, thereby reducing power consumption of the terminal. This embodiment has little impact on the existing standard. In addition, the terminal does not need to be detached from a network. Therefore, existing transmission is not interrupted, data transmission continuity can be ensured, and user experience is good.

In a possible implementation, the terminal sets the at least one information bit in the ePHR in the first time period, where the at least one information bit is used to request the network device to instruct the terminal to adjust the transmit power on the one or more carriers corresponding to the at least one information bit to 0, and the terminal sets a PH value corresponding to the at least one information bit in the ePHR to an invalid value; and/or the terminal sets the at least one information bit in the ePHR in the first time period, where the at least one information bit is used to request the network device to instruct the terminal to reduce the transmit power on the one or more carriers corresponding to the at least one information bit by a first transmit power value, and the terminal sets a PH value corresponding to the at least one information bit in the ePHR, where the PH value is used to indicate the first transmit power value; and/or the terminal sets the at least one information hit in the ePHR in the first time period, where the at least one information bit is used to request the network device to instruct the terminal to reduce the transmit power on the one or more carriers corresponding to the at least one information bit by a preset power back-off value. According to this implementation, in addition to the at least one information bit of the ePHR, the terminal also sets the PH value, so that the network device can adjust uplink resource scheduling for the terminal and/or the TPC parameter on the corresponding carrier based on the at least one information bit of the ePHR and the PH value, thereby reducing power consumption of the terminal.

In a possible implementation, the terminal selects the one or more carriers from the carriers in any one of the following manners: The terminal selects a first carrier set from the carriers in a third time period, and selects a second carrier set from the carriers in a fourth time period, where the first carrier set and the second carrier set include different carriers; or the terminal randomly selects the one or more carriers from the carriers; or the terminal selects the one or more carriers with a worst CQI or a best CQI from the carriers; or the terminal selects the one or more carriers with smallest power headroom from the carriers; or the terminal selects the one or more carriers with highest maximum transmit power from the carriers.

According to a fifth aspect, a method for adjusting power of a terminal is provided. A network device receives an ePHR from the terminal; and the network device schedules an uplink resource and/or determines a TPC parameter on a corresponding carrier based on at least one information bit of the ePHR, where the at least one information bit of the ePHR is used to request the network device to instruct the terminal to reduce transmit power on one or more carriers.

In this embodiment of the present invention, the network device can adjust uplink resource scheduling for the terminal and/or the TPC parameter on the corresponding carrier based on the at least one information bit of the ePHR, thereby reducing power consumption of the terminal. This embodiment has little impact on the existing standard. In addition, the terminal does not need to be detached from a network. Therefore, existing transmission is not interrupted, data transmission continuity can be ensured, and user experience is good.

According to another aspect, an embodiment of the present invention provides a terminal. The terminal can implement a function performed by the terminal in the method example in the first aspect and/or the second aspect and/or the third aspect and/or the fourth aspect. The function may be implemented by hardware, or may be implemented by hardware executing corresponding software. The hardware or the software includes one or more modules corresponding to the foregoing function.

In a possible design, a structure of the terminal includes a processor and a communications interface. The processor is configured to support the terminal in performing the corresponding function in the foregoing method. The communications interface is configured to support communication between the terminal and a base station or another network device. The terminal may further include a memory. The memory is configured to be coupled to the processor, and store a program instruction and data that are necessary to the terminal.

According to another aspect, an embodiment of the present invention provides a network device. The network device can implement a function performed by the network device in the method embodiment in the fifth aspect. The function may be implemented by hardware, or may be implemented by hardware executing corresponding software. The hardware or the software includes one or more modules corresponding to the foregoing function.

In a possible design, a structure of the network device includes a processor and a communications interface. The processor is configured to support the network device in performing the corresponding function in the foregoing method. The communications interface is configured to support communication between the network device and a terminal or another network device. The network device may further include a memory. The memory is configured to be coupled to the processor, and store a program instruction and data that are necessary to the network device.

According to another aspect, an embodiment of the present invention provides a communications system. The system includes the terminal and the network device in the foregoing aspects.

According to still another aspect, an embodiment of the present invention provides a computer storage medium, configured to store a computer software instruction used by the foregoing terminal. The computer storage medium includes a program designed for performing the first aspect and/or the second aspect and/or the third aspect and/or the fourth aspect.

According to still another aspect, an embodiment of the present invention provides a computer storage medium, configured to store a computer software instruction used by the foregoing network device. The computer storage medium includes a program designed for performing the fifth aspect.

According to still another aspect, an embodiment of the present invention provides a computer program product, including an instruction. When the program is executed by a computer, the instruction causes the computer to perform the function performed by the terminal in the foregoing method design.

According to still another aspect, an embodiment of the present invention provides a computer program product, including an instruction. When the program is executed by a computer, the instruction causes the computer to perform the function performed by the network device in the foregoing method design.

DESCRIPTION OF DRAWINGS

FIG. 1 is a schematic structural diagram of a MAC CE of an ePHR according to an embodiment of the present invention;

DESCRIPTION OF EMBODIMENTS

Figure 2:
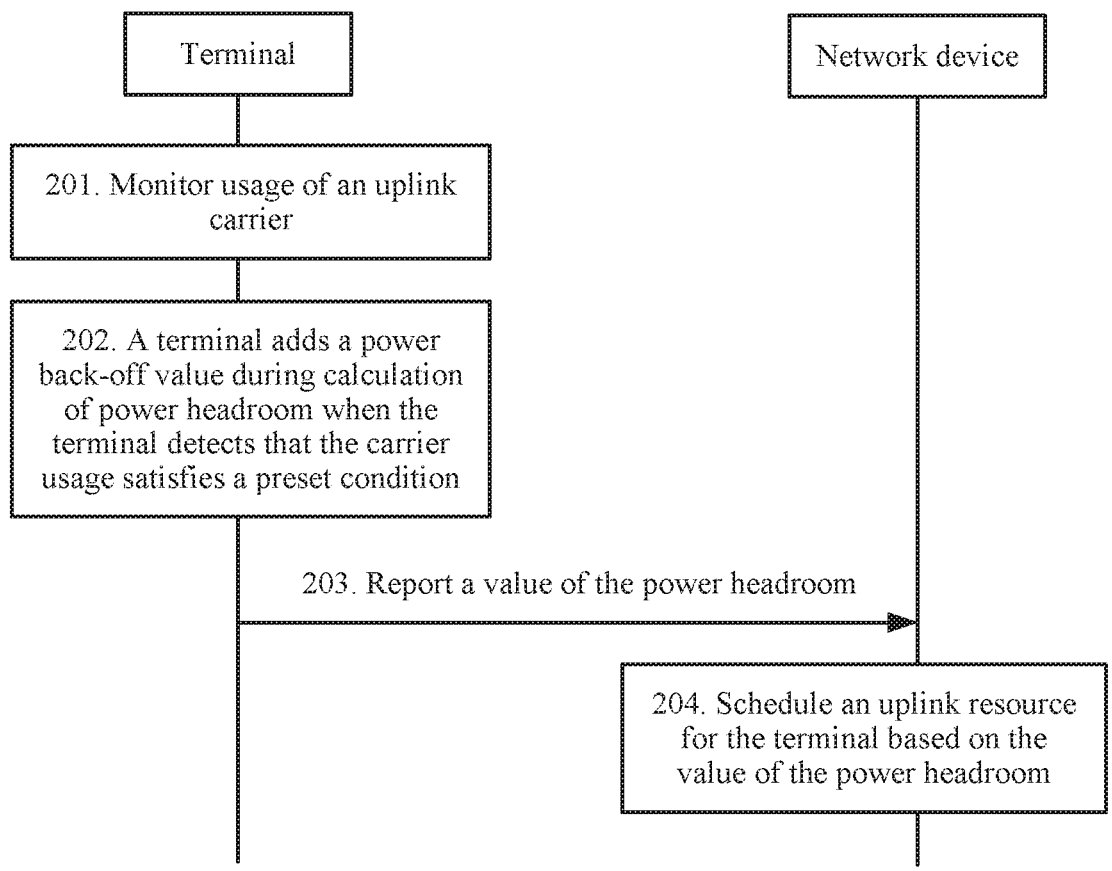
FIG. 2 is a schematic communication diagram of a method for adjusting power of a terminal according to an embodiment of the present invention.

To make the objective, technical solutions, and advantages of the embodiments of the present invention clearer, the following describes the technical solutions of the embodiments of the present invention with reference to the accompanying drawings in the embodiments of the present invention.

In an uplink transmission process, UE sends a power headroom report (Power Headroom Report, PHR) to an eNB. The UE may report a PHR with a negative value to the eNB, to indicate that an estimated power consumption value required by subsequent transmission exceeds maximum transmit power of the UE.

After receiving the PHR with the negative value, the eNB may correspondingly reduce a quantity of resources scheduled for the UE, for example, reduce a quantity of scheduled uplink transmission physical resource blocks (Physical Resource Block, PRB), to reduce transmit power of a terminal.

In a current PHR mechanism, only estimated transmit power is prevented from exceeding maximum transmit power, and heating caused by an increasing quantity of carriers cannot be resolved. For example, when a path loss between the UE and the eNB is relatively small, the UE only needs relatively low transmit power to perform uplink transmission with the eNB. In this case, even if the quantity of carriers increases, the maximum transmit power of the UE is not exceeded. In other words, the PHR is not a negative value. However, continuous power consumption on a radio frequency channel and a baseband channel still causes heating.

In the embodiments of the present invention, an existing mechanism of sending a PHR is used, and a reported value of power headroom (Power Headroom, PH) is adjusted, or an information bit of an extended power headroom report (Extended Power Headroom Report, ePHR) is set, so as to resolve possible heating caused by a plurality of operating uplink carriers, thereby reducing power consumption of a terminal without interrupting ongoing uplink transmission of the terminal.

In the embodiments of the present invention, the PHR mechanism is used to adjust a quantity of resources (a quantity of carriers or a quantity of PRBs) used by the terminal during uplink transmission. Two methods are provided in the embodiments of the present invention to reduce the power consumption of the terminal. In one method, in a PH calculation process, when heating caused by excessive power consumption occurs or the terminal reaches a particular temperature threshold, the terminal performs power back-off, so that the PH is reduced, for example, the PH becomes a negative value. In this way, a network device can reduce an uplink resource to be scheduled in subsequent scheduling, thereby reducing the power consumption of the terminal. In the other method, the terminal uses a reserved bit in a media access control (Media Access Control, MAC) control element (control element, CE) in an ePHR to indicate that the terminal needs to adjust transmit power on a specific carrier. After receiving the message, a base station may adjust uplink resource scheduling and/or a transmit power control command (Transmission Power Command, TPC) parameter on the corresponding carrier.

For ease of understanding, a definition of the PHR and definitions of related parameters in a standard are first described.

A PHR procedure is to provide, for a serving eNB of UE, information about a difference between nominal maximum transmit power of the UE and estimated transmit power on an uplink shared channel in each active serving cell, and information about a difference between the nominal maximum transmit power of the UE and estimated transmit power on each of a physical uplink control channel (Physical Uplink Control Channel, PUCCH) and an uplink shared channel in a special cell (Special Cell, SpCell) and a PUCCH secondary serving cell.

Power headroom of each carrier may be calculated according to the following method: $PH_c = P_{cmax,c} - P_c$, where $PH_c$ indicates power headroom calculated by the terminal for a carrier c; $P_{cmax,c}$ indicates maximum power on the carrier c; and $P_c$ indicates power scheduled on the carrier c.

A terminal of a release of LTE-A R10 supports reporting two types of power headroom. For a first type (Type 1), only transmit power of a physical uplink shared channel (Physical Uplink Shared Channel, PUSCH) is considered. Therefore, the first type of PH reported in PHR is obtained by subtracting the transmit power of the PUSCH from $P_{cmax,c}$. For a second type (Type 2), transmit power of the UE when the UE simultaneously sends a PUSCH and a PUCCH is considered. Therefore, the second type of PH reported in PHR is obtained by subtracting transmit power of the PUSCH and transmit power of the PUCCH from $P_{cmax,c}$.

FIG. 1 is a schematic structural diagram of a MAC CE of an ePHR. The ePHR is carried in a MAC CE of the ePHR, and the MAC CE of the ePHR is indicated by a subheader (subheader) of a MAC protocol data unit (Protocol Data Unit, PDU) with a logical channel ID (Logical Channel ID, LCID) of 11001.

Ci indicates uplink secondary serving cells (SCell) in which the UE reports PH, and if Ci is set to 1, it indicates that the UE reports PH on an uplink carrier of a SCell with a SCell index i; otherwise, the UE does not report the PH.

R is a reserved bit, and is set to 0.

V indicates whether calculated PH is based on a reference format. For PH of Type 1, V=0 indicates that the PH is calculated based on real transmission of a PUSCH, and indicates that $P_{cmax,c}$ is reported in a supplementary manner; V=1 indicates that the PH is calculated based on a reference format of a PUSCH, and indicates that $P_{cmax,c}$ is not reported. For PH of Type 2, V=0 indicates that the PH is calculated based on real transmission of a PUCCH, and indicates that $P_{cmax,c}$ is reported in a supplementary manner; V=1 indicates that the PH is calculated based on a reference format of a PUCCH, and indicates that $P_{cmax,c}$ is not reported.

PH indicates a power headroom level (Power Headroom Level) and is indicated by using 6 bits. A reported value of the PH and a corresponding power headroom level are shown in Table 1. Table 2 shows a correspondence between a power headroom level and a measurement value, ranging from −23 dB to 40 dB, with a granularity of 1 dB.

TABLE 1

| PH value | Power headroom level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

TABLE 2

| Power headroom level | Measurement value (dB) |
|---|---|
| POWER_HEADROOM_0 | −23 ≤ PH < −22 |
| POWER_HEADROOM_1 | −22 ≤ PH < −21 |
| POWER_HEADROOM_2 | −21 ≤ PH < −20 |
| POWER_HEADROOM_3 | −20 ≤ PH < −19 |
| POWER_HEADROOM_4 | −19 ≤ PH < −18 |
| POWER_HEADROOM_5 | −18 ≤ PH < −17 |
| ... | ... |
| POWER_HEADROOM_57 | 34 ≤ PH < 35 |
| POWER_HEADROOM_58 | 35 ≤ PH < 36 |
| POWER_HEADROOM_59 | 36 ≤ PH < 37 |
| POWER_HEADROOM_60 | 37 ≤ PH < 38 |
| POWER_HEADROOM_61 | 38 ≤ PH < 39 |
| POWER_HEADROOM_62 | 39 ≤ PH < 40 |
| POWER_HEADROOM_63 | PH ≥ 40 |

P indicates whether UE uses power back-off due to power management.

$P_{cmax,c}$ is 6 bits, and if $P_{cmax,c}$ exists, it indicates that $P_{cmax,c}$ used during calculation of the PH is reported. The reported $P_{cmax,c}$ and a corresponding nominal UE transmit power level are shown in Table 3.

TABLE 3

| PCMAX, c | Nominal UE transmit power level |
|---|---|
| 0 | PCMAX_C_00 |
| 1 | PCMAX_C_01 |
| 2 | PCMAX_C_02 |
| ... | ... |
| 61 | PCMAX_C_61 |
| 62 | PCMAX_C_62 |
| 63 | PCMAX_C_63 |

In the PHR report, if PH is a positive value, it indicates that the UE can still send a signal at relatively high transmit power, or can still support a relatively high throughput. If PH is a negative value, it indicates that the UE has been in a maximum transmit power state.

Therefore, a core idea of the embodiments of the present invention is to reduce a value of PH or send a transmit power adjustment request when power consumption is very high. Reducing a value of PH may be, but is not limited to, setting the PH to a negative value.

FIG. 2 is a schematic communication diagram of a method for adjusting power of a terminal according to an embodiment of the present invention. In this embodiment, a manner of adjusting a reported value of PH through event triggering is used, so that power consumption of the terminal is reduced. Referring to FIG. 2, the method includes the following steps.

Step 201. The terminal monitors usage of an uplink carrier, where the carrier usage includes at least one of a quantity of carriers, duration of continuous use of one or more carriers, and a temperature of the terminal.

The temperature of the terminal is a temperature obtained by using a temperature detection module inside the terminal, and may be at least one of a temperature of the entire terminal and a temperature of a specific module in the terminal.

That the terminal monitors usage of an uplink carrier may include any one of the following cases: The terminal monitors the quantity of carriers. The terminal monitors the duration of continuous use of one or more carriers. The terminal monitors the temperature of the terminal. The terminal monitors the quantity of carriers and the duration of continuous use of one or more carriers. The terminal monitors the quantity of carriers and the temperature of the terminal. The terminal monitors the duration of continuous use of one or more carriers and the temperature of the terminal. The terminal monitors the quantity of carriers, the duration of continuous use of one or more carriers, and the temperature of the terminal.

Step 202. The terminal adds a power back-off value during calculation of power headroom when the terminal detects that the carrier usage satisfies a preset condition, to reduce a value of power headroom of the one or more carriers.

For example, a power back-off value is first defined, denoted as P_offset. A value of P_offset may be determined by the terminal or may be configured by a network or may be a preset value, to adjust a reported value of PH to a negative value, or even to −23 dB. Then a reported value of PH is adjusted: PHc_new=PHc−P_offset, where PHc is initial power headroom of a carrier c, P_offset is a power back-off value, and PHc_new is adjusted power headroom of the carrier c. In the example, P_offset is a value greater than or equal to zero, and if P_offset is set to a negative value, the reported value of PH may be adjusted according to PHc_new=PHc+P_offset. In addition, for different carriers, values of P_offset may be different. Therefore, the values of P_offset are not limited in the present invention.

In this embodiment of the present invention, there may be a plurality of options for the terminal to monitor the carrier usage, and correspondingly, there are a plurality of options for the carrier usage to satisfy the preset condition.

In an example, the terminal monitors the quantity of carriers; and the terminal adds the power back-off value during the calculation of the power headroom when the quantity of carriers reaches a first quantity threshold, to reduce the value of the power headroom of the one or more carriers.

In another example, the terminal monitors the duration of continuous use of one or more carriers; and the terminal adds the power back-off value during the calculation of the power headroom when duration of continuous use of each of the one or more carriers reaches a first time threshold or duration of continuous use of each of more than a predetermined quantity of carriers in the one or more carriers reaches the first time threshold, to reduce the value of the power headroom of the one or more carriers.

In still another example, the terminal monitors the temperature of the terminal; and the terminal adds the power back-off value during the calculation of the power headroom when the temperature of the terminal reaches a first temperature threshold, to reduce the value of the power headroom of the one or more carriers.

In still another example, the terminal monitors the quantity of carriers and the duration of continuous use of one or more carriers; and the terminal adds the power back-off value during the calculation of the power headroom when the quantity of carriers reaches a second quantity threshold, and/or when duration of continuous use of each of the one or more carriers reaches a second time threshold or duration of continuous use of each of more than a predetermined quantity of carriers in the one or more carriers reaches the second time threshold, to reduce the value of the power headroom of the one or more carriers.

In still another example, the terminal monitors the quantity of carriers, the duration of continuous use of one or more carriers, and the temperature of the terminal; and the terminal adds the power back-off value during the calculation of the power headroom when the quantity of carriers reaches a third quantity threshold, and/or when duration of continuous use of each of the one or more carriers reaches a third time threshold or duration of continuous use of each of more than a predetermined quantity of carriers in the one or more carriers reaches the third time threshold, and/or when the temperature of the terminal reaches a third temperature threshold, to reduce the value of the power headroom of the one or more carriers.

Step 203. The terminal reports the value of the power headroom to a network device.

For example, the terminal chooses to report an adjusted PH value at a latest PH reporting moment.

Step 204. The network device schedules an uplink resource for the terminal based on the value of the power headroom.

In this embodiment of the present invention, to enable the terminal to work according to a normal PH reporting procedure after the temperature drops to a target value, a timer or another temperature threshold may be set to stop adjusting the reported value of PH. A preset temperature threshold and a length of the timer may be determined by the terminal based on a statistical result, for example, a temporal change in the quantity of used carriers and the temperature that is detected by the terminal. A setting of the length of the tinier may be determined based on an estimated time required by the temperature to drop to a preset value.

In an example, after step 202, the method further includes: starting, by the terminal, a timer; and stopping adding, by the terminal, the power back-off value during the calculation of the power headroom when the timer ends, to stop reducing the value of the power headroom of the one or more carriers.

In another example, after step 202, the method further includes: stopping adding, by the terminal, the power back-off value during the calculation of the power headroom when the temperature of the terminal drops to a second temperature threshold, to stop reducing the value of the power headroom of the one or more carriers, where the first temperature threshold is greater than the second temperature threshold.

In this embodiment of the present invention, a rule may be preset for the terminal to determine carriers on which power back-off processing is to be performed. For example, the terminal may select the one or more carriers from the carriers in any one of the following manners: The terminal selects a first carrier set from the carriers in a first time period, and selects a second carrier set from the carriers in a second time period, where the first carrier set and the second carrier set include different carriers; or the terminal randomly selects the one or more carriers from the carriers; or the terminal selects the one or more carriers with a worst channel quality indicator (Channel Quality indicator CQI) or a best CQI from the carriers; or the terminal selects the one or more carriers with smallest power headroom from the carriers; or the terminal selects the one or more carriers with highest maximum transmit power (Pcmax,c) from the carriers.

In this embodiment of the present invention, the terminal monitors the usage of the uplink carrier, and reduces the reported value of power headroom by using an event triggering mechanism, so that the network device can adjust uplink resource scheduling for the terminal based on the reported value of the power headroom, thereby reducing the power consumption of the terminal. This embodiment has little impact on the existing standard. In addition, the terminal does not need to be detached from a network. Therefore, existing transmission is not interrupted, data transmission continuity can be ensured, and user experience is good.

Figure 3:
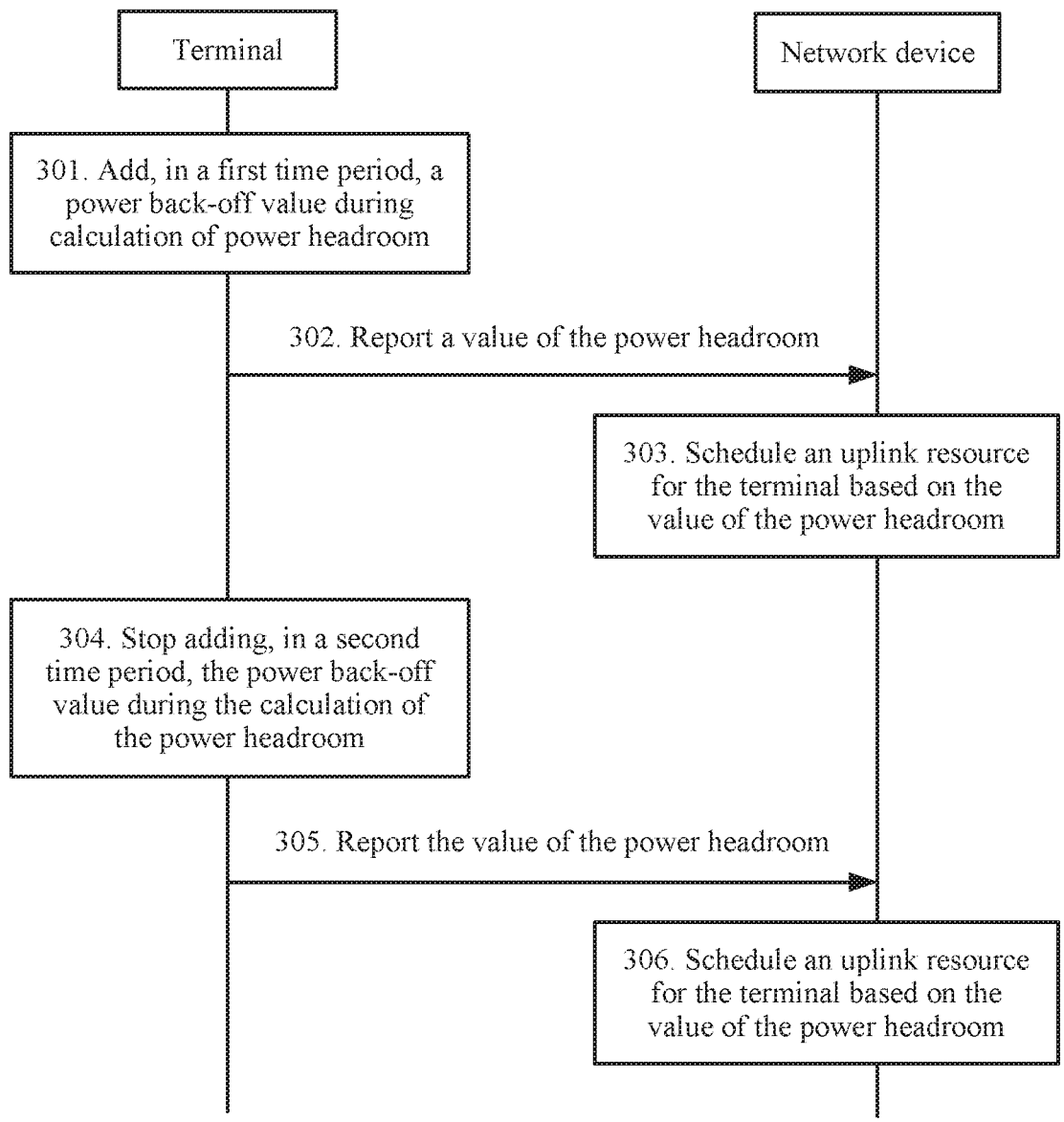
FIG. 3 is a schematic communication diagram of another method for adjusting power of a terminal according to an embodiment of the present invention.

FIG. 3 is a schematic communication diagram of another method for adjusting power of a terminal according to an embodiment of the present invention. In this embodiment, a manner of adjusting a reported value of PH through periodic triggering is used, so that power consumption of the terminal is reduced. Referring to FIG. 3, the method includes the following steps.

Step 301. The terminal adds, in a first time period, a power back-off value during calculation of power headroom, to reduce a value of power headroom of one or more carriers.

Step 302. The terminal reports the value of the power headroom to a network device.

Step 303. The network device schedules an uplink resource for the terminal based on the value of the power headroom.

Step 304. The terminal stops adding, in a second time period, the power back-off value during the calculation of the power headroom, to stop reducing the value of the power headroom of the one or more carriers.

Step 305. The terminal reports the value of the power headroom to the network device.

Step 306. The network device schedules an uplink resource for the terminal based on the value of the power headroom.

In this embodiment of the present invention, a rule may be preset for the terminal to determine carriers on which power back-off processing is to be performed. An applicable rule is the same as the rule in the embodiment shown in FIG. 2. Details are not described herein again.

In this embodiment of the present invention, the reported value of the power headroom is reduced through periodic triggering, so that the network device can adjust uplink resource scheduling for the terminal based on the reported value of the power headroom, thereby reducing the power consumption of the terminal, and reducing transmit power before a temperature rises to a particular threshold.

Figure 4:
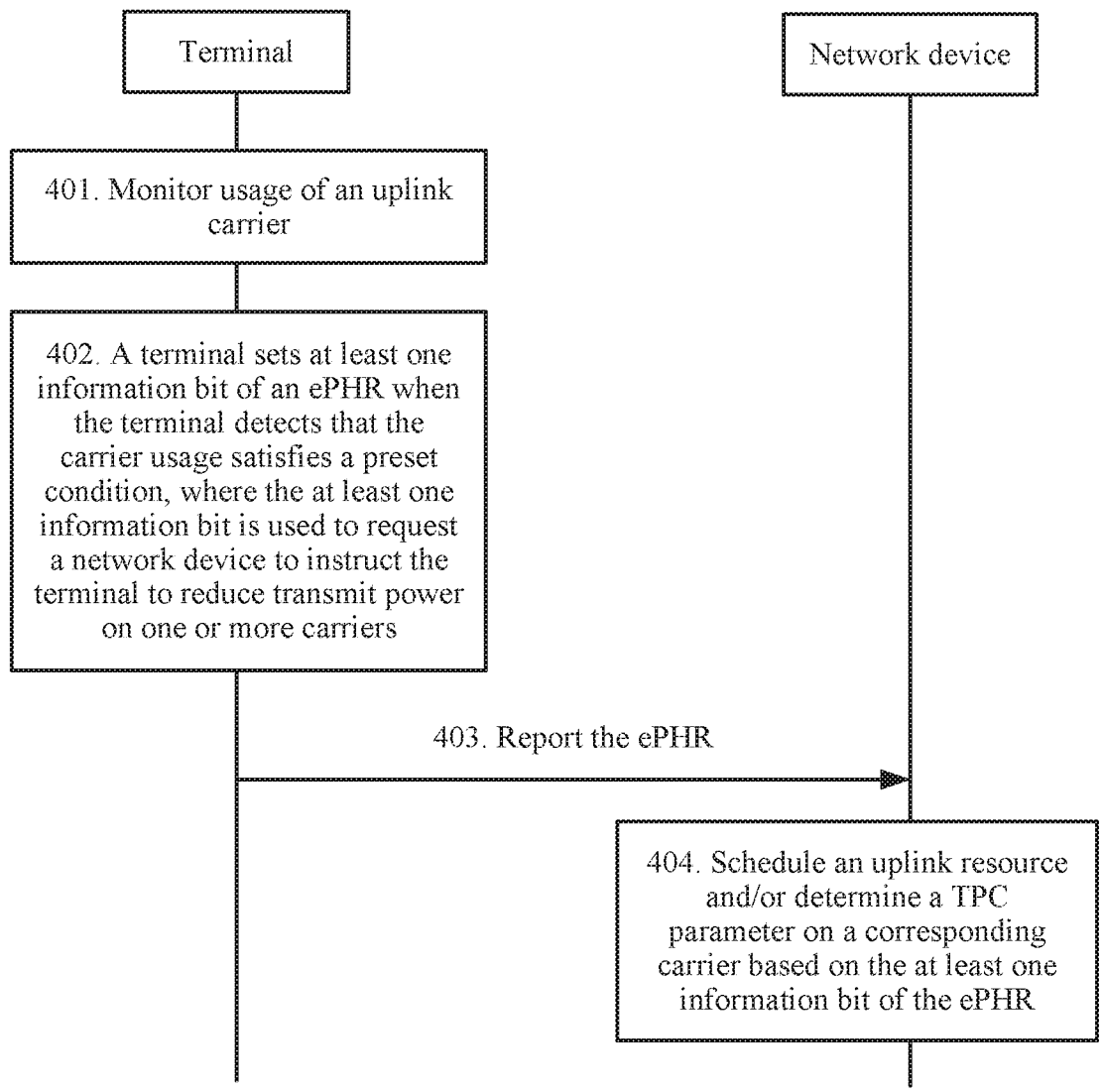
FIG. 4 is a schematic communication diagram of still another method for adjusting power of a terminal according to an embodiment of the present invention.

FIG. 4 is a schematic communication diagram of still another method for adjusting power of a terminal according to an embodiment of the present invention. In this embodiment, a manner of triggering an uplink transmit power adjustment request by using an event is used, so that power consumption of the terminal is reduced. Referring to FIG. 4, the method includes the following steps.

Step 401. The terminal monitors usage of an uplink carrier, where the carrier usage includes at least one of a quantity of carriers, duration of continuous use of one or more carriers, and a temperature of the terminal.

The temperature of the terminal is a temperature obtained by using a temperature detection module inside the terminal, and may be at least one of a temperature of the entire terminal and a temperature of a specific module in the terminal.

That the terminal monitors usage of an uplink carrier may include any one of the following cases: The terminal monitors the quantity of carriers. The terminal monitors the duration of continuous use of one or more carriers. The terminal monitors the temperature of the terminal. The terminal monitors the quantity of carriers and the duration of continuous use of one or more carriers. The terminal monitors the quantity of carriers and the temperature of the terminal. The terminal monitors the duration of continuous use of one or more carriers and the temperature of the terminal. The terminal monitors the quantity of carriers, the duration of continuous use of one or more carriers, and the temperature of the terminal.

Step 402. The terminal sets at least one information bit of an extended power headroom report ePHR when the terminal detects that the carrier usage satisfies a preset condition, where the at least one information bit is used to request a network device to instruct the terminal to reduce transmit power on one or more carriers.

In an example, the terminal sets the at least one information bit in the ePHR, where the at least one information bit is used to request the network device to instruct the terminal to adjust the transmit power on the one or more carriers corresponding to the at least one information bit to 0, and the terminal sets a power headroom value corresponding to the at least one information bit in the ePHR to an invalid value (in this case, any power headroom PH value corresponding to the at least one information bit in the ePHR may be considered as an invalid value); and/or the terminal sets the at least one information bit in the ePHR, where the at least one information bit is used to request the network device to instruct the terminal to reduce the transmit power on the one or more carriers corresponding to the at least one information bit by a first transmit power value, and the terminal sets a power headroom PH value corresponding to the at least one information bit in the ePHR, where the PH value is used to indicate the first transmit power value and/or the terminal sets the at least one information bit in the ePHR, where the at least one information bit is used to request the network device to instruct the terminal to reduce the transmit power on the one or more carriers corresponding to the at least one information bit by a preset power back-off value.

For example, a reserved bit in the ePHR is used to indicate that UE needs to adjust transmit power on a specific carrier. A bit "R" corresponding to a specific carrier in a MAC CE of the ePHR is set to 1, to indicate that uplink transmit power on the carrier needs to be adjusted. There are three possible adjustment manners: If the UE requests to adjust the uplink transmit power to 0, a PH value on the corresponding carrier is invalid. If the UE requests to reduce the uplink transmit power, a PH field may be used to indicate a transmit power value to be reduced. The transmit power on the corresponding carrier is backed off by a default value, and a definition of the PH field is not changed. In this case, a default power back-off value needs to be defined.

Further, a timer may be preset, to indicate that within a valid value of the timer, the transmit power that is on the carrier and that is reported by the UE has always been adjusted. When "R" is restored to 0, it indicates that the UE reports a PH value according to an existing standard procedure.

In this embodiment of the present invention, there may be a plurality of options for the terminal to monitor the carrier usage, and correspondingly, there are a plurality of options for the carrier usage to satisfy the preset condition.

In an example, the terminal monitors the quantity of carriers, and the terminal sets the at least one information bit of the ePHR when the quantity of carriers reaches a first quantity threshold, where the at least one information bit is used to request the network device to instruct the terminal to reduce the transmit power on the one or more carriers.

In another example, the terminal monitors the duration of continuous use of one or more carriers, and the terminal sets the at least one information bit of the ePHR when duration of continuous use of each of the one or more carriers reaches a first time threshold or duration of continuous use of each of more than a predetermined quantity of carriers in the one or more carriers reaches the first time threshold, where the at least one information bit is used to request the network device to instruct the terminal to reduce the transmit power on the one or more carriers.

In still another example, the terminal monitors the temperature of the terminal, and the terminal sets the at least one information bit of the ePHR when the temperature of the terminal reaches a first temperature threshold, where the at least one information bit is used to request the network device to instruct the terminal to reduce the transmit power on the one or more carriers.

In still another example, the terminal monitors the quantity of carriers and the duration of continuous use of one or more carriers, and the terminal sets the at least one information bit of the ePHR when the quantity of carriers reaches a second quantity threshold, and/or when duration of continuous use of each of the one or more carriers reaches a second time threshold or duration of continuous use of each of more than a predetermined quantity of carriers in the one or more carriers reaches the second time threshold, where the at least one information bit is used to request the network device to instruct the terminal to reduce the transmit power on the one or more carriers.

In still another example, the terminal monitors the quantity of carriers, the duration of continuous use of one or more carriers, and the temperature of the terminal, and the terminal sets the at least one information bit of the ePHR when the quantity of carriers reaches a third quantity threshold, and/or when duration of continuous use of each of the one or more carriers reaches a third time threshold or duration of continuous use of each of more than a predetermined quantity of carriers in the one or more carriers reaches the third time threshold, and/or when the temperature of the terminal reaches a third temperature threshold, where the at least one information bit is used to request the network device to instruct the terminal to reduce the transmit power on the one or more carriers.

Step 403. The terminal reports the ePHR to the network device.

Step 404. The network device schedules an uplink resource and/or determines a TPC parameter on a corresponding carrier based on the at least one information bit of the ePHR.

In this embodiment of the present invention, to enable the terminal to work according to a normal PH reporting procedure after the temperature drops to a target value, a timer or another temperature threshold may be set to stop adjusting uplink transmit power. A preset temperature threshold and a length of the timer may be determined by the terminal based on a statistical result, for example, a temporal change in the quantity of used carriers and the temperature that is detected by the terminal. A selling of the length of the timer may be determined based on an estimated time required by the temperature to drop to a preset value.

In an example, after step 402, the method further includes: starting, by the terminal, a timer; and stopping setting, by the terminal, the at least one information bit of the ePHR when the timer ends, where the at least one information bit is used to request the network device to instruct the terminal to stop reducing the transmit power on the one or more carriers.

In another example, after step 402, the method further includes: stopping setting, by the terminal, the at least one information bit of the ePHR when the temperature of the terminal drops to a second temperature threshold, where the at least one information bit is used to request the network device to instruct the terminal to stop reducing the transmit power on the one or more carriers, and the first temperature threshold is greater than the second temperature threshold.

In this embodiment of the present invention, a rule may be preset for the terminal to determine carriers on which power back-off processing is to be performed. For example, the terminal may select the one or more carriers from the carriers in any one of the following manners: The terminal selects a first carrier set from the carriers in a first time period, and selects a second carrier set from the carriers in a second time period, where the first carrier set and the second carrier set include different carriers; or the terminal randomly selects the one or more carriers from the carriers; or the terminal selects the one or more carriers with a worst channel quality indicator (Channel Quality Indicator CQI) or a best CQI from the carriers; or the terminal selects the one or more carriers with smallest power headroom from the carriers; or the terminal selects the one or more carriers with highest maximum transmit power from the carriers.

In this embodiment of the present invention, the terminal monitors the usage of the uplink carrier, and sends an uplink power adjustment request to the network device by using the information bit in the ePHR and an event triggering mechanism, so that the network device can adjust uplink resource scheduling for the terminal and/or adjust a TPC parameter on a corresponding carrier according to the uplink power adjustment request, thereby reducing power consumption of the terminal. This embodiment has little impact on the existing standard. In addition, the terminal does not need to be detached from a network. Therefore, existing transmission is not interrupted, data transmission continuity can be ensured, and user experience is good.

Figure 5:
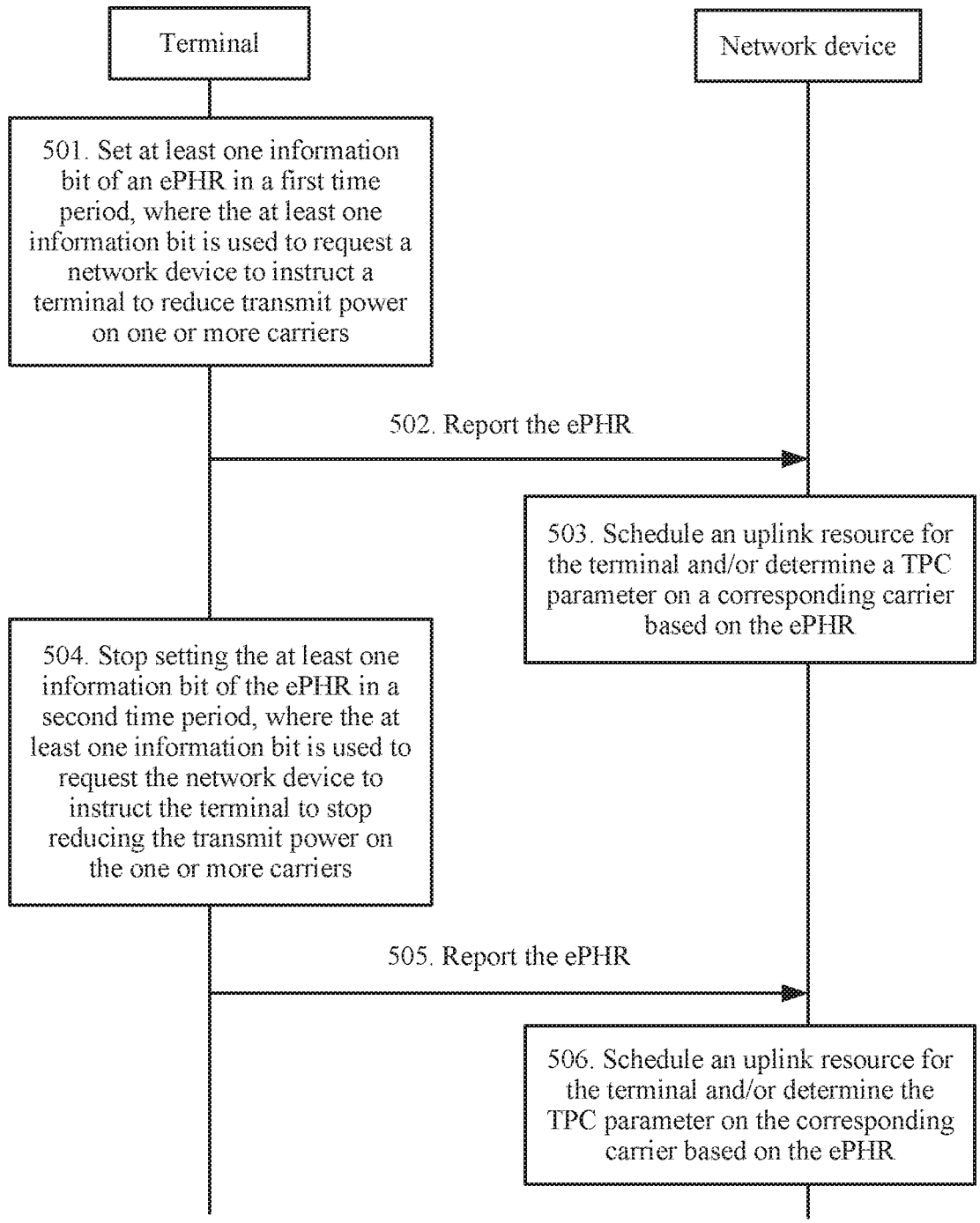
FIG. 5 is a schematic communication diagram of still another method for adjusting power of a terminal according to an embodiment of the present invention.

FIG. 5 is a schematic communication diagram of still another method for adjusting power of a terminal according to an embodiment of the present invention. In this embodiment, a manner of periodically triggering an uplink transmit power adjustment request is used, so that power consumption of the terminal is reduced. Referring to FIG. 5, the method includes the following steps.

Step 501. The terminal sets at least one information bit of an ePHR in a first time period, where the at least one information bit is used to request a network device to instruct the terminal to reduce transmit power on one or more carriers.

In an example, the terminal sets the at least one information bit in the ePHR in the first time period, where the at least one information bit is used to request the network device to instruct the terminal to adjust the transmit power on the one or more carriers corresponding to the at least one information bit to 0, and the terminal sets a power headroom PH value corresponding to the at least one information bit in the ePHR to an invalid value (in this case, any power headroom PH value corresponding to the at least one information bit in the ePHR may be considered as an invalid value); and/or the terminal sets the at least one information bit in the ePHR in the first time period, where the at least one information bit is used to request the network device to instruct the terminal to reduce the transmit power on the one or more carriers corresponding to the at least one information bit by a first transmit power value, and the terminal sets a power headroom PH value corresponding to the at least one information bit in the ePHR, where the PH value is used to indicate the first transmit power value; and/or the terminal sets the at least one information bit in the ePHR in the first time period, where the at least one information bit is used to request the network device to instruct the terminal to reduce the transmit power on the one or more carriers corresponding to the at least one information bit by a preset power back-off value.

Step 502. The terminal reports the ePHR to the network device.

Step 503. The network device schedules an uplink resource for the terminal and/or determines a TPC parameter on a corresponding carrier based on the ePHR.

Step 504. The terminal stops setting the at least one information bit of the ePHR in a second time period, where the at least one information bit is used to request the network device to instruct the terminal to stop reducing the transmit power on the one or more carrier.

Step 505. The terminal reports the ePHR to the network device.

Step 506. The network device schedules an uplink resource for the terminal and/or determines the TPC parameter on the corresponding carrier based on the ePHR.

In this embodiment of the present invention, a rule may be preset for the terminal to determine carriers on Which power back-off processing is to be performed. An applicable rule is the same as the rule in the embodiment shown in FIG. 4. Details are not described herein again.

In this embodiment of the present invention, an uplink power adjustment request is sent to the network device by using the information bit in the ePHR and through periodic triggering, so that the network device can adjust uplink resource scheduling for the terminal and/or adjust a TPC parameter on a corresponding carrier according to the uplink power adjustment request, thereby reducing power consumption of the terminal. This embodiment has little impact on the existing standard. In addition, the terminal does not need to be detached from a network. Therefore, existing transmission is not interrupted, data transmission continuity can be ensured, and user experience is good.

The solutions of the embodiments of the present invention are mainly described above from a perspective of interaction between network elements. It may be understood that, to implement the foregoing functions, the network elements such as the terminal and the network device include corresponding hardware structures and/or software modules for performing the functions. A person skilled in the art should easily be aware that, example units and algorithms steps described with reference to the embodiments disclosed in this specification can be implemented in the present invention in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

In the embodiments of the present invention, function modules of the terminal, the network device, and the like may be obtained through division based on the foregoing method examples. For example, each function module may be obtained through division corresponding to each function, or two or more functions may be integrated into one processing module. The integrated module may be implemented in a form of hardware, or may be implemented in a form of a software function module. It should be noted that, in the embodiments of the present invention, module division is an example, and is merely a logical function division. In an actual implementation, there may be another division manner.

Figure 6:
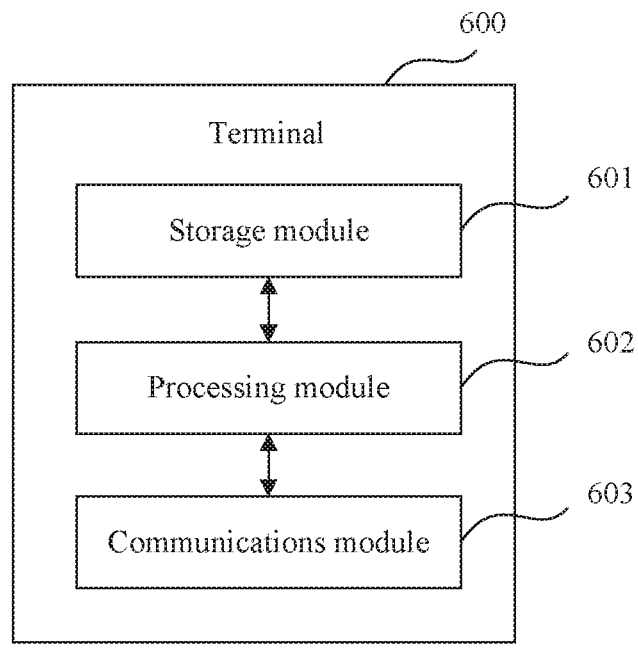
FIG. 6 is a schematic structural diagram of a terminal according to an embodiment of the present invention.

When an integrated module is used, FIG. 6 is a possible schematic structural diagram of the terminal in the foregoing embodiments. A terminal 600 includes a processing module 602 and a communications module 603. The processing module 602 is configured to control and manage actions of the terminal. For example, the processing module 602 is configured to support the terminal in performing processes 201 to 203 in FIG. 2, processes 301 to 304 in FIG. 3, processes 401 to 403 in FIG. 4, processes 501 to 504 in FIG. 5, and/or other processes of the technology described in this specification. The communications module 603 is configured support communication between the terminal and another network device, for example, communication between the terminal and a base station. The terminal may further include a storage module 601, configured to store program code and data of the terminal.

The processing module 602 may be a processor or a controller, for example, may be a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The processing module 602 may implement or execute various example logical blocks, modules, and circuits described with reference to content disclosed in the present invention. Alternatively, the processor may be a combination implementing a computing function, for example, a combination including one or more microprocessors, or a combination of a DSP and a microprocessor. The communications module 603 may be a communications interface, a transceiver, a transceiver circuit, or the like. The communications interface is a generic term, and may include one or more interfaces. The storage module 601 may be a memory.

Figure 7:
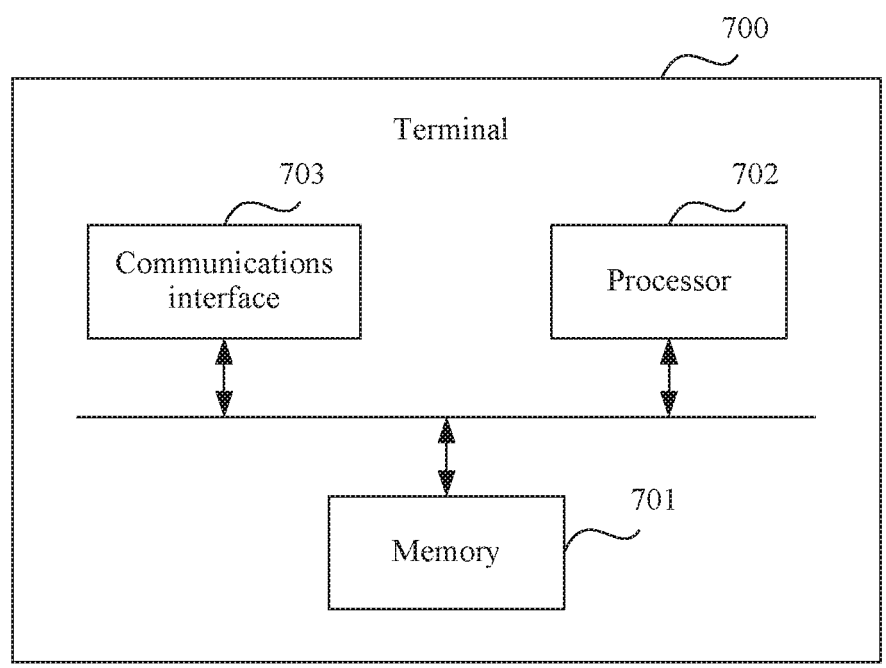
FIG. 7 is a schematic structural diagram of another terminal according to an embodiment of the present invention.

When the processing module 602 is a processor, the communications module 603 is a communications interface, and the storage module 601 is a memory, the terminal in this embodiment of the present invention may be a terminal shown in FIG. 7.

Referring to FIG. 7, the terminal 700 includes a processor 702, a communications interface 703, and a memory 701.

The communications interface 703, the processor 702, and the memory 701 may be connected to one another through a communication connection.

Method or algorithm steps described with reference to the content disclosed in the present invention may be implemented by hardware, or may be implemented by a processor by executing a software instruction. The software instruction may include a corresponding software module. The software module may be stored in a random access memory (Random Access Memory, RAM), a flash memory, a read-only memory (Read-Only Memory, ROM), an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. An example storage medium is coupled to a processor, so that the processor can read information from the storage medium and can write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in the foregoing one or more examples, the functions described in the present invention may be implemented by hardware, software, firmware, or any combination thereof. When being implemented by software, the foregoing functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a general-purpose or dedicated computer.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, improvement, or the like made based on the technical solutions of the present invention shall fall within the protection scope of the present invention.

What is claimed is:

1. A method for adjusting power of a terminal and implemented by the terminal, wherein the method comprises:
   monitoring usage of an uplink carrier, wherein the usage of the uplink carrier comprises a temperature of the terminal and at least one of a quantity of carriers or a duration of continuous use of one or more carriers;
   adding a power back-off value during calculation of power headroom such that a value of the power headroom is a negative value in response to the terminal detecting that the usage of the uplink carrier satisfies a preset condition comprising the temperature of the terminal reaching a first temperature threshold and at least one of the quantity of carriers reaching a first quantity threshold or the duration of continuous use of the one or more carriers reaching a first time threshold;
   stopping the adding when the temperature of the terminal drops to a second temperature threshold that is less than the first temperature threshold; and
   reporting the value of the power headroom to a network device.

2. The method of claim 1, wherein monitoring the usage of the uplink carrier comprises monitoring the quantity of carriers, and wherein the preset condition comprises the quantity of carriers reaching the first quantity threshold.

3. The method of claim 1, wherein monitoring the usage of the uplink carrier comprises monitoring the duration of continuous use of the one or more carriers, and wherein the preset condition comprises:
   the duration of continuous use of each of the one or more carriers reaches the first time threshold, or
   the duration of continuous use of each of more than a predetermined quantity of carriers in the one or more carriers reaches the first time threshold.

4. The method of claim 1, further comprising starting a timer in response to starting adding the power back-off value.

5. The method of claim 1, wherein monitoring the usage of the uplink carrier comprises monitoring the quantity of carriers and the duration of continuous use of the one or more carriers, and wherein the preset condition further comprises:
   the quantity of carriers reaches a second quantity threshold; or
   a duration of continuous use of each of the one or more carriers reaches a second time threshold or a duration of continuous use of each of more than a predetermined quantity of carriers in the one or more carriers reaches the second time threshold.

6. The method of claim 1, wherein monitoring the usage of the uplink carrier comprises monitoring the quantity of carriers, the duration of continuous use of one or more carriers, and the temperature of the terminal, and wherein the preset condition further comprises:
   the quantity of carriers reaches a third quantity threshold; and
   a duration of continuous use of each of the one or more carriers reaches a third time threshold or a duration of continuous use of each of more than a predetermined quantity of carriers in the one or more carriers reaches the third time threshold.

7. The method of claim 1, wherein adding the power back-off value during calculation of power headroom comprises:
   selecting the one or more carriers by selecting a first carrier set from the carriers in a first time period, and selecting a second carrier set from the carriers in a second time period, wherein the first carrier set and the second carrier set comprise different carriers;
   randomly selecting the one or more carriers from the carriers;
   selecting the one or more carriers with a worst channel quality indicator (CQI) or a best CQI from the carriers;
   selecting the one or more carriers with smallest power headroom from the carriers; or
   selecting the one or more carriers with highest maximum transmit power from the carriers.

8. A method implemented by a terminal for adjusting power of the terminal, wherein the method comprises:
   monitoring usage of an uplink carrier, wherein the usage of the uplink carrier comprises a temperature of the terminal and at least one of a quantity of carriers or a duration of continuous use of one or more carriers;

setting at least one information bit of a first extended power headroom report (ePHR) in response to the usage satisfying a preset condition comprising the temperature of the terminal reaching a first temperature threshold and at least one of the quantity of carriers reaching a first quantity threshold or the duration of continuous use of the one or more carriers reaching a first time threshold, wherein the at least one information bit is for requesting a network device to instruct the terminal to reduce transmit power on one or more carriers;

starting a timer in response to setting the at least one information bit;

subsequent to setting the at least one information bit, sending the first ePHR to the network device; and requesting the network device to instruct the terminal to stop reducing the transmit power on the one or more carriers by:
stopping the setting in a second ePHR in response to the timer ending; and
reporting the second ePHR to the network device.

9. The method of claim 8, wherein monitoring usage of the uplink carrier comprises monitoring the quantity of carriers, and wherein the preset condition comprises the quantity of carriers reaching the first quantity threshold.

10. The method of claim 8, wherein monitoring the usage of the uplink carrier comprises monitoring the duration of continuous use of the one or more carriers, and wherein the preset condition further comprises:
a duration of continuous use of each of the one or more carriers reaches the first time threshold, or
a duration of continuous use of each of more than a predetermined quantity of carriers in the one or more carriers reaches the first time threshold.

11. The method of claim 8, wherein setting the at least one information bit comprises setting a power headroom (PH) value that corresponds to an invalid value.

12. The method of claim 8, wherein monitoring the usage of the uplink carrier comprises monitoring the quantity of carriers and the duration of continuous use of the one or more carriers, and wherein the preset condition further comprises:
the quantity of carriers reaching the first quantity threshold;
a duration of continuous use of each of the one or more carriers reaching the first time threshold; or
a duration of continuous use of each of more than a predetermined quantity of carriers in the one or more carriers reaching the first time threshold.

13. The method of claim 8, wherein monitoring the usage of the uplink carrier comprises monitoring the quantity of carriers and the duration of continuous use of one or more carriers, and wherein the preset condition further comprises:
the quantity of carriers reaching the first quantity threshold; or
a duration of continuous use of each of more than a predetermined quantity of carriers in the one or more carriers reaching the first time threshold.

14. The method of claim 8, wherein setting the at least one information bit of the first ePHR comprises:
setting a first power headroom (PH) value and the at least one information bit in the first ePHR, wherein the at least one information bit is for requesting the network device to instruct the terminal to adjust the transmit power on the one or more carriers corresponding to the at least one information bit to zero (0), and wherein the first PH value corresponds to the at least one information bit in the first ePHR and corresponds to an invalid value;

setting a second PH value and the at least one information bit in the first ePHR, wherein the at least one information bit instructs the terminal to reduce the transmit power on the one or more carriers corresponding to the at least one information bit by a first transmit power value, and wherein the second PH value corresponds to the at least one information bit in the first ePHR and indicates the first transmit power value; or setting the at least one information bit in the first ePHR, wherein the at least one information bit instructs the terminal to reduce the transmit power on the one or more carriers corresponding to the at least one information bit by a preset power back-off value.

15. The method of claim 8, wherein setting the at least one information bit of the ePHR when the terminal detects that the usage satisfies the preset condition comprises:
selecting a first carrier set and a second carrier set, wherein the first carrier set is selected from the carriers in a first time period, wherein the second carrier set is selected from the carriers in a second time period, and wherein the first carrier set and the second carrier set comprise different carriers;
randomly selecting the one or more carriers from the carriers;
selecting one or more carriers having a worst channel quality indicator (CQI) or a best CQI from the carriers;
selecting one or more carriers having a smallest power headroom from the carriers; or
selecting one or more carriers having a highest maximum transmit power from the carriers.

16. A terminal, comprising
a communications interface;
a memory; and
a processor coupled to the communications interface and the memory and configured to:
monitor usage of an uplink carrier, wherein the usage of the uplink carrier comprises a temperature of the terminal and at least one of a quantity of carriers or a duration of continuous use of one or more carriers;
add a power back-off value during calculation of power headroom such that a value of the power headroom is a negative value in response to the usage of the uplink carrier satisfying a preset condition comprising the temperature of the terminal reaching a first temperature threshold and at least one of the quantity of carriers reaching a first quantity threshold or the duration of continuous use of the one or more carriers reaching a first time threshold;
stop adding the power back-off value when the temperature of the terminal drops to a second temperature threshold that is less than the first temperature threshold; and
report, using the communications interface, the value of the power headroom to a network device.

17. The terminal of claim 16, wherein the processor is further configured to:
monitor the quantity of carriers; and
add the power back-off value during the calculation of the power headroom in response to the quantity of carriers reaching the first quantity threshold.

18. The terminal of claim 16, wherein the processor is further configured to monitor the duration of continuous use of one or more carriers and wherein the preset condition further comprises:

a duration of continuous use of each of the one or more carriers reaching the first time threshold; or a duration of continuous use of each of more than a predetermined quantity of carriers in the one or more carriers reaching the first time threshold.

19. The terminal of claim 16, wherein the processor is further configured to start a timer in response to starting adding the power back-off value.

20. The terminal of claim 16, wherein the processor is configured to monitor the quantity of carriers and the duration of continuous use of the one or more carriers, and wherein the preset condition further comprises:

the quantity of carriers reaching the first quantity threshold;

a duration of continuous use of each of the one or more carriers reaching the first time threshold; or a duration of continuous use of each of more than a predetermined quantity of carriers in the one or more carriers reaching the first time threshold.

21. The terminal of claim 20, wherein the preset condition comprises the duration of continuous use of each of more than the predetermined quantity of carriers in the one or more carriers reaching the first time threshold.

* * * * *